(12) United States Patent
Alikhani (10) Patent No.: US 9,294,474 B1
(45) Date of Patent: Mar. 22, 2016

(54) VERIFICATION BASED ON INPUT COMPRISING CAPTURED IMAGES, CAPTURED AUDIO AND TRACKED EYE MOVEMENT

(71) Applicant: EMC Corporation, Hopkinton, MA (US)

(72) Inventor: Kayvan Alikhani, Oakland, CA (US)

(73) Assignee: EMC Corporation, Hopkinton, MA (US)

( * ) Notice: Subject to any disclaimer, the term of this patent is extended or adjusted under 35 U.S.C. 154(b) by 254 days.

(21) Appl. No.: 14/080,290

(22) Filed: Nov. 14, 2013

Related U.S. Application Data (63) Continuation-in-part of application No. 14/025,333, filed on Sep. 12, 2013, and a continuation-in-part of application No. 14/025,377, filed on Sep. 12, 2013.

(60) Provisional application No. 61/726,778, filed on Nov. 15, 2012, provisional application No. 61/726,788, filed on Nov. 15, 2012, provisional application No. 61/726,908, filed on Nov. 15, 2012.

(51) Int. Cl.
*G06F 7/04* (2006.01)
*H04L 29/06* (2006.01)

(52) U.S. Cl.
CPC .................................. *H04L 63/0861* (2013.01)

(58) Field of Classification Search
CPC . H04L 63/0861; H04L 63/08; H04L 63/0853; H04L 2463/082; H04L 9/3231; H04L 9/3215; H04L 9/3271; H04L 63/068; H04L 63/0846; H04L 63/0869; H04L 63/0884; H04L 63/12; G06F 21/32; G06F 21/31; G06F 21/36; G06F 21/30; G06F 2221/2137; G06F 3/013; G07F 17/3206; G07F 17/1008; G07F 9/023
USPC ............................................................ 726/7
See application file for complete search history.

(56) References Cited

U.S. PATENT DOCUMENTS 4,449,189 A    5/1984   Feix et al.
4,975,969 A   12/1990   Tal (Continued)

FOREIGN PATENT DOCUMENTS

EP       2385679 A1   11/2011
WO    2004075097 A1    9/2004

(Continued)

OTHER PUBLICATIONS

De Angeli(2002). VIP: a visual approach to user authentication. AVI '02 Proceedings of the Working Conference on Advanced Visual Interfaces, pp. 316-323.*

(Continued)

*Primary Examiner* — Brian Shaw
(74) *Attorney, Agent, or Firm* — Ryan, Mason & Lewis, LLP (57) ABSTRACT

In one embodiment, a method comprises receiving a verification request, sending one or more patterns for display at one or more specified locations on a screen of a device, receiving verification input responsive to the one or more patterns, and granting or denying the verification request based at least in part on the verification input. The verification input comprises one or more captured images, captured audio and tracked eye movement. The verification request may be generated in conjunction with an attempted launch of a designated application on a first device, with user access to the designated application on the first device being controlled responsive to the granting or denying of the verification request.

20 Claims, 8 Drawing Sheets

(56) References Cited

U.S. PATENT DOCUMENTS

| | | |
|---|---|---|
| 4,993,068 A | 2/1991 | Piosenka et al. |
| 5,235,642 A | 8/1993 | Wobber et al. |
| 5,761,329 A | 6/1998 | Chen et al. |
| 6,463,474 B1 | 10/2002 | Fuh et al. |
| 6,671,812 B1 | 12/2003 | Balasubramaniam et al. |
| 6,724,919 B1 | 4/2004 | Akiyama et al. |
| 6,856,800 B1 | 2/2005 | Henry et al. |
| 7,173,604 B2 | 2/2007 | Marvit et al. |
| 7,206,022 B2 | 4/2007 | Miller et al. |
| 7,222,361 B2 | 5/2007 | Kemper |
| 7,231,068 B2 | 6/2007 | Tibor |
| 7,243,245 B2 | 7/2007 | Pagan |
| 7,322,040 B1 | 1/2008 | Olson et al. |
| 7,363,494 B2 | 4/2008 | Brainard et al. |
| 7,480,655 B2 | 1/2009 | Thomas et al. |
| 7,970,724 B1 | 6/2011 | Hauser |
| 8,244,211 B2 | 8/2012 | Clark |
| 8,249,577 B2 | 8/2012 | Chmaytelli et al. |
| 8,347,370 B2 | 1/2013 | Headley |
| 8,370,640 B2 | 2/2013 | Adams et al. |
| 8,386,773 B2 | 2/2013 | Sherkin et al. |
| 2001/0047472 A1 | 11/2001 | Huntington et al. |
| 2004/0250135 A1 | 12/2004 | Haddad et al. |
| 2005/0044044 A1 | 2/2005 | Burger et al. |
| 2006/0137016 A1 | 6/2006 | Margalit et al. |
| 2009/0077644 A1 | 3/2009 | Hammell et al. |
| 2009/0144810 A1* | 6/2009 | Gilboy .................. H04L 63/18 726/5 |
| 2009/0309698 A1 | 12/2009 | Headley et al. |
| 2009/0320123 A1 | 12/2009 | Yu et al. |
| 2012/0011575 A1 | 1/2012 | Cheswick et al. |
| 2012/0019361 A1 | 1/2012 | Ben Ayed |
| 2012/0047563 A1 | 2/2012 | Wheeler |
| 2012/0124662 A1 | 5/2012 | Baca et al. |
| 2013/0044055 A1* | 2/2013 | Karmarkar .............. G06F 3/013 345/158 |
| 2013/0078952 A1 | 3/2013 | Yang |
| 2013/0144788 A1 | 6/2013 | Sherkin et al. |
| 2013/0227651 A1* | 8/2013 | Schultz .................. G06F 21/32 726/4 |
| 2013/0263211 A1* | 10/2013 | Neuman ................. H04L 63/08 726/1 |

FOREIGN PATENT DOCUMENTS

| | | |
|---|---|---|
| WO | 2008094136 A1 | 8/2008 |
| WO | 20080144943 A1 | 12/2008 |
| WO | 2011157538 A1 | 12/2011 |

OTHER PUBLICATIONS

Goggle Play, "Battlenet Mobile Authenticator," https://play.google.com/store/apps/details?id=com.blizzard.bma&hl=en, Mar. 2012, 2 pages.

A. Bhargav-Spantzel et al., "Privacy Preserving Multi-Factor Authentication with Biometrics," 2nd ACM Workshop on Digital Identity Management (DIM), Nov. 2006, pp. 63-71.

* cited by examiner

VERIFICATION BASED ON INPUT COMPRISING CAPTURED IMAGES, CAPTURED AUDIO AND TRACKED EYE MOVEMENT

PRIORITY CLAIM

The present application claims the priority of U.S. Provisional Patent Application Ser. Nos. 61/726,778, 61/726,788 and 61/726,908, filed Nov. 15, 2012, which are incorporated by reference herein. The present application is also a continuation-in-part of U.S. patent application Ser. Nos. 14/025,333 and 14/025,377, filed Sep. 12, 2013, which are incorporated by reference herein. The present application is also related to commonly-assigned U.S. patent application Ser. Nos. 14/080,306 and 14/080,327, filed concurrently herewith and incorporated by reference herein.

FIELD

The field relates generally to user verification, and more particularly to techniques for verifying the identity of a user of an electronic device.

BACKGROUND

It is common practice for electronic devices to have verification systems to ensure the identity of the user. Most often, there is only a single means of protection such as a password. Having only one means of protection, however, can make it easier for an adversary to gain access to restricted accounts. In instances where multiple forms of identification are required, the verification process can be greatly delayed as each verification step must be processed separately and thus adds to the overall time required to verify a user. Additionally, common methods of verification do not ensure the liveliness of user. Because of this, it is possible for an adversary to use prefabricated verification credentials to imitate a user's identity.

SUMMARY

Illustrative embodiments of the present invention provide improved techniques for verification of user identity. Such arrangements exhibit significantly enhanced security relative to conventional arrangements while also ensuring quick means of verification. For example, in some embodiments, multiple verification credentials are gathered at the same time, thus reducing the overall amount of time required to verify a user. Additionally, randomized verification patterns are produced to ensure the liveliness of a user and prevents adversaries from using prefabricated verification credentials.

In one embodiment, a method comprises receiving a verification request, sending one or more patterns for display at one or more specified locations on a screen of a device, receiving verification input responsive to the one or more patterns, and granting or denying the verification request based at least in part on the verification input. The verification input comprises one or more captured images, captured audio and tracked eye movement.

In another embodiment, a method comprises receiving, from a verification platform, a notification regarding a verification request and providing, to the verification platform, verification input responsive to the notification. The notification comprises one or more patterns for display at one or more specified locations on a screen of a device and the verification input comprises one or more captured images, captured audio and tracked eye movement. The verification request is granted or denied by the verification platform based at least in part on the verification input.

All illustrations of the drawings are for the purpose of describing exemplary embodiments of the present invention and are not intended to limit the scope of the present invention in any way.

DETAILED DESCRIPTION

Illustrative embodiments of the present invention will be described herein with reference to exemplary systems and associated verification platforms, user devices and other processing devices. It is to be appreciated, however, that the invention is not restricted to use with the particular illustrative system and device configurations shown. Accordingly, the term "communication system" as used herein is intended to be broadly construed, so as to encompass, for example, systems in which a single user device communicates with another processing device associated with a verification platform, systems in which at least two user devices each communicate with another processing device associated with a verification platform, and other types of systems.

A number of embodiments of the invention will be described with reference to the flow diagrams of FIGS. 1-6 and the communication system diagram of FIG. 7. A given such embodiment implements verification of user identity based on input including captured images, captured audio and tracked eye movement using a verification service that is supported by a verification platform. The verification service interacts with a verification application installed on first and second user devices, also referred to herein as primary and secondary devices. Such devices may be considered examples of what are more generally referred to herein as simply first and second devices.

The verification service is implemented using a verification platform that illustratively includes a verification platform application programming interface (API) and a verification platform server. The verification platform API supports communication with verification agents implemented on respective ones of the primary and secondary devices. The verification application on each user device illustratively includes a user interface for login, application selection and verification selection, but numerous alternative screen arrangements or other types of user interfaces can be used in other embodiments.

Although primary and secondary user devices are used for identity verification in some embodiments, other embodiments can use other types and arrangements of processing devices. For example, certain of the described arrangements can be adapted in a straightforward manner for use with a single user device rather than primary and secondary user devices as in the illustrative embodiments. Also, other embodiments can be adapted to utilize three or more user devices to perform identity verification.

The primary and secondary user devices communicate with one another via the verification platform. Accordingly, the user verification techniques described in conjunction with the illustrative embodiments of FIGS. 1 through 8 do not require that the two devices be in close proximity to one another. The use of the verification platform as an intermediary between the primary and secondary devices also allows for enhanced communication security, thereby reducing vulnerability to hacking.

The embodiments of FIGS. 1 through 8 may be viewed as more particular examples of arrangements in which the verification platform receives a verification request from the primary device, and sends one or more patterns for display at one or more specified locations on a screen of the primary or secondary device. The verification platform receives verification input responsive to the one or more patterns, and grants or denies the verification request based at least in part on the verification input received from the primary or secondary device.

As will be described, the one or more patterns sent from the verification platform to the primary or secondary device include a number of patterns for display at specified locations on a screen of the primary or secondary device. The one or more patterns may be respective phrases, alphanumeric series of digits, or combinations of phrases and digits. The patterns, as well as the specified locations on the screen, may be randomly generated.

The verification request may be generated, for example, in conjunction with an attempted launch of a designated application on the primary device, and user access to the designated application on the primary device may be controlled responsive to the granting or denying of the verification request. The designated application on the primary device is also referred to herein as a "secure application" or a "protected application" as its access from the primary device is conditioned on satisfactory completion of live verification. A verification request may also be generated on occurrence of various other events and transactions. For example, a verification request may be generated when a user attempts to perform a particular action within a secure application rather than on attempted launch of the secure application. While verification requests are described below primarily in the context of a user attempt to launch a protected application, verification requests may be generated for numerous other events, transactions, etc.

As a more particular example, when a secure application is launched on a primary device that is also running the verification application, the primary device verification agent intercepts the launch of the application from the primary device. The primary device verification agent then searches to see if the secure application requires live verification to launch. If the secure application requires live verification then the verification platform server sends one or more patterns for display on a screen of the primary or secondary device. The primary or secondary device provides input in response to the patterns.

In some embodiments, the input includes one or more captured images, captured audio, and tracked eye movement. The captured images may be of a face of the user providing the verification input. The captured audio may be a recording of the user speaking the one or more patterns displayed on the screen, while the tracked eye movement includes data indicating a location on the screen that the user was viewing while speaking the one or more patterns. The primary or secondary device encrypts and sends the verification input to the verification platform API, which relays the information to the verification platform server.

The verification platform server compares the verification input to determine whether to grant or deny a verification request. The captured images are analyzed to determine if the captured images match a facial profile of the user. It is to be appreciated that the verification input sent from the primary or secondary device need not contain the actual captured images. Instead, the verification input may comprise some data or other information derived from such images, such as one or more points of comparison sufficient to determine if the captured images match a facial profile of a user.

The captured audio is analyzed to determine if the captured audio matches a voice profile for the user. The captured audio is further analyzed to determine whether the user spoke the phrases or digits of the one or more patterns. Similar to the captured images, the verification input need not contain the actual captured audio. Instead, the verification input may comprise some data or other information derived from the captured audio such as one or more points of comparison sufficient to determine if the captured audio matches a voice profile of a user.

The tracked eye movement is analyzed to determine what location or locations of a screen of the primary or secondary device that a user was viewing while speaking the phrases or digits of the one or more patterns. The one or more patterns sent to the primary or secondary device are for display at specified locations on a screen. Thus, the tracked eye movement can be compared to see if the locations viewed by the user match the specified locations.

If the verification input matches, the verification platform server informs the verification platform API which in turn sends an encrypted message to the primary device verification agent to allow the secure application to be launched. If the verification input does not match then the verification platform server informs the verification platform API which in turn instructs the primary device verification agent to deny or prevent the secure application from being launched.

Accordingly, in some embodiments, granting of the verification request requires that the primary device and/or the secondary device be enrolled in the verification service supported by the verification platform. Such enrollment may also be referred to herein as involving enrollment of a corresponding user in the verification service.

Figure 1:
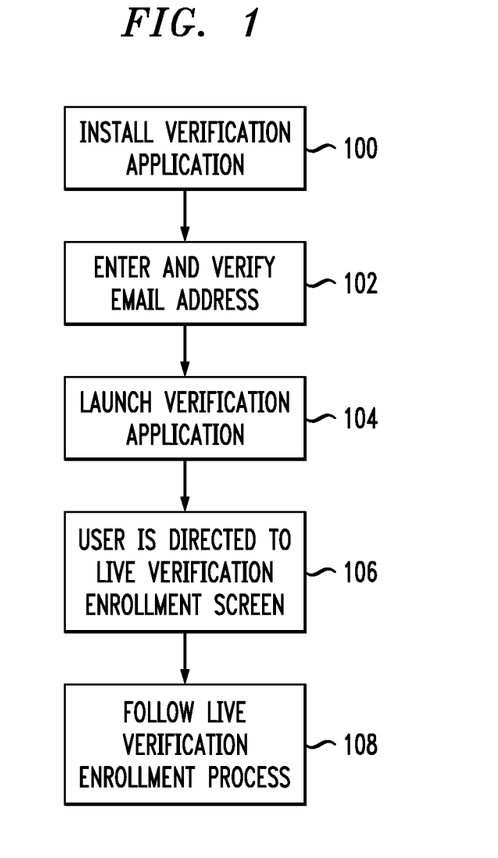
FIG. 1 is a flowchart illustrating a process of live verification registration and verification application installation.

An exemplary process for live verification registration and verification application installation for an electronic device is shown in FIG. 1. This process includes steps 100 through 108.

In step 100, the verification application is installed on the device by a user. Once the verification application has been installed, the user registers an email address with the verification service and goes through an email verification process as indicated in step 102. More generally, a user may register with the verification service using a user identification. In some embodiments, the user identification may be the same as or different from the user's email address.

When the email address has been verified the verification application is launched in step 104. When a user first registers a device with the verification service, the user is directed to a live verification enrollment screen in step 106. The user is then directed to follow the live enrollment process in step 108.

In some embodiments, live verification enrollment for users can be managed using a web-based administrative interface. In this way, users can add, update and remove verification credentials. Verification credentials are an example of what is more generally referred to herein as verification input. Various combinations of verification methods may be utilized. In some embodiments, the verification methods include voice verification, face verification and liveliness verification. Embodiments, however, are not limited solely to use with these verification methods. Instead, a wide variety of other verification methods may be used for a live verification service in addition to or in place of the above-described verification methods. Such methods include, by way of example, location verification and motion verification.

The verification application may be installed on more than one device for a particular user. In some embodiments primary and secondary devices are used for live verification. Both the primary and secondary devices are associated with the same user. For example, the primary device may be a mobile telephone of a given user and the secondary device may be a laptop, tablet or desktop computer of that same user, or vice versa. The primary and secondary devices can be registered in any order. Also, it is possible in some embodiments to enroll multiple primary devices and/or multiple secondary devices.

Figure 2:
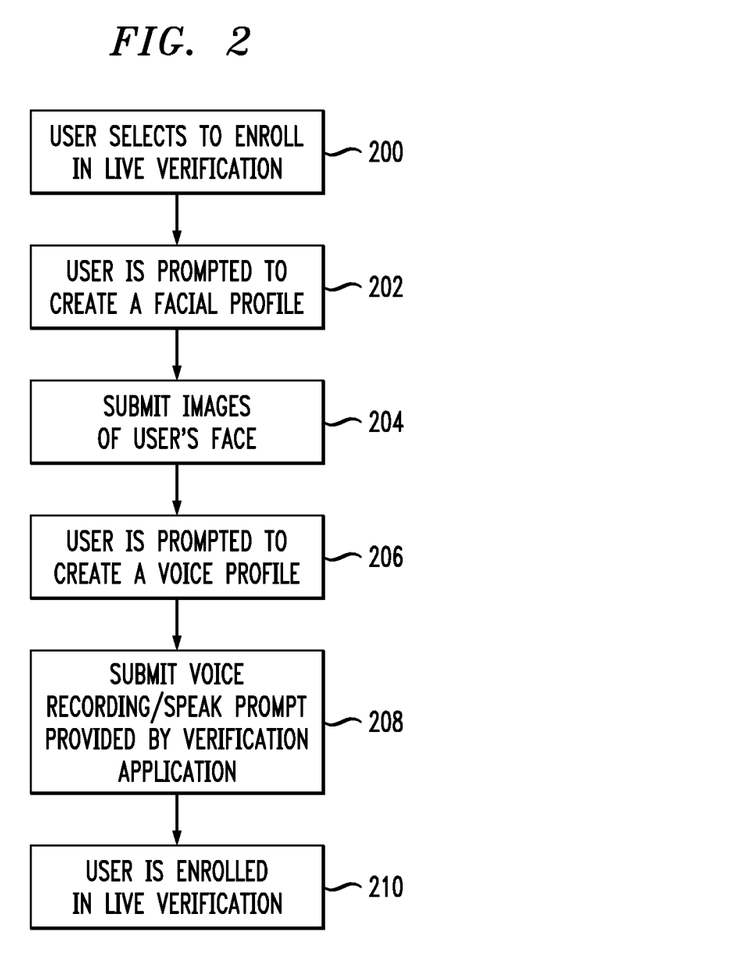
FIG. 2 is a flowchart illustrating enrollment in a live verification service.

FIG. 2 illustrates an exemplary process for enrollment in a live verification service. FIG. 2 illustrates an example of the live verification enrollment process referred to in step 108. Once a user has installed the verification application on an electronic device, they are directed to enroll in live verification. The primary and secondary devices are examples of electronic devices on which a user enrolls in live verification. In step 200, the user selects to enroll in the live verification service.

Upon reaching the live verification enrollment screed, the user is prompted to create a facial profile in step 202. A facial profile is created by submitting multiple images of the user's face in step 204. The user can choose to upload an image from the device or to take new images with the device. The submitted images are stored remotely on the verification platform server. In some embodiments, the submitted images are also stored locally to allow for local verification as will be detailed below.

In step 206, the user is prompted to create a voice profile. When a user creates a voice profile, a series of phrases or randomly selected digits are displayed on the screen and the user verbally dictates the displayed phrases or digits into a microphone of the device in step 208. The voice recordings are stored remotely on the verification platform server. In some embodiments, the voice recordings are also stored locally to allow for local verification. After the user has created both a facial profile and a voice profile, the user is enrolled in the live verification service in step 210.

Figure 3:
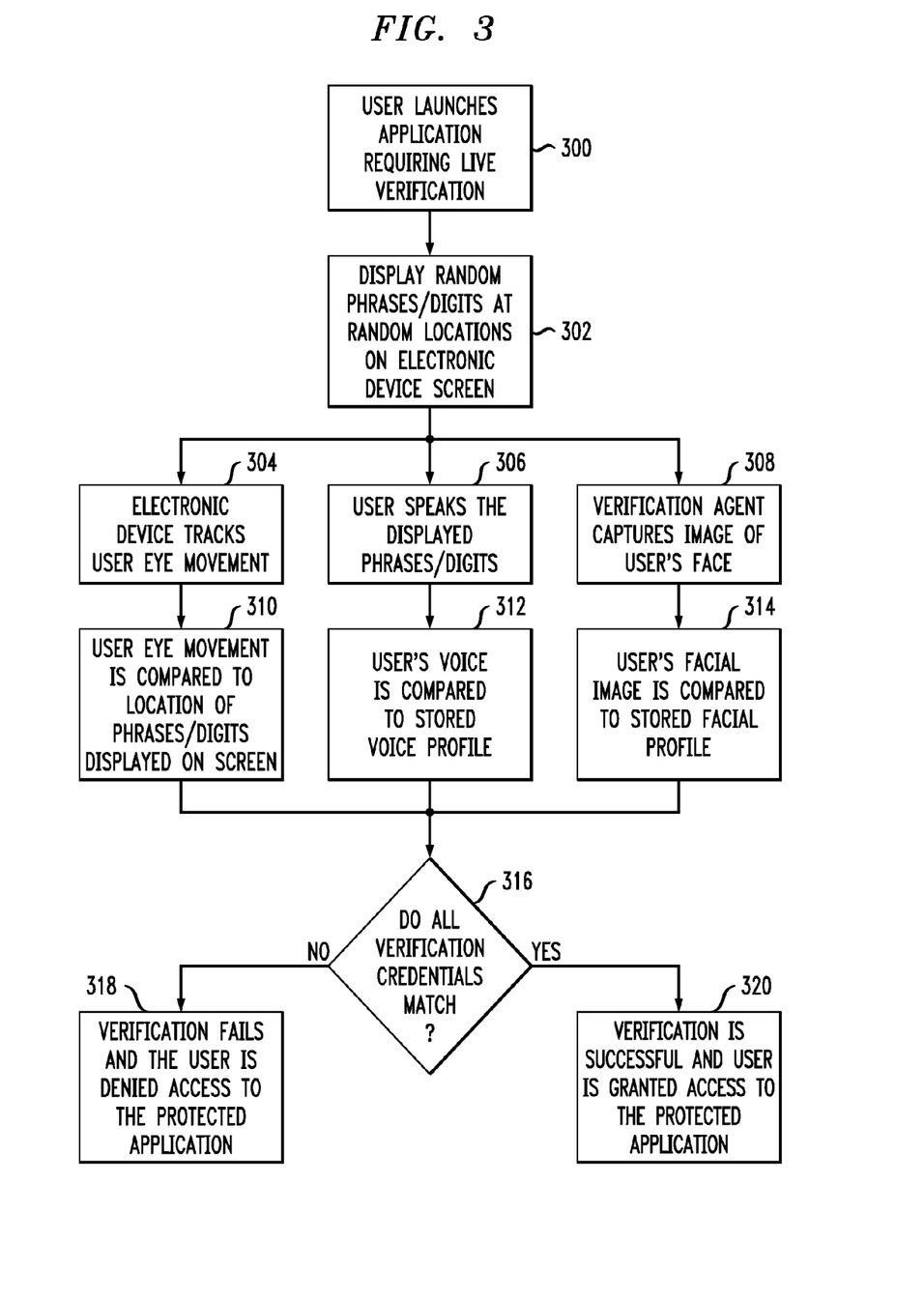
FIG. 3 is a flowchart illustrating a live verification process.

A live verification process is illustrated in the flowchart of FIG. 3, which includes steps 300 through 322. The live verification begins with step 300, where a user attempts to launch an application which requires live verification. This attempt is an example of a verification request. The verification request is an example of what is more generally referred to herein as a "notification" responsive to which verification input is provided. Applications which require live verification are examples of secure or protected applications.

The live verification process continues with step 302, displaying randomly generated phrases, digits or combinations of phrases and digits at random locations on a screen of the user's device. In some embodiments, the user attempts to launch a secure application on one device and the random phrases/digits are displayed on the screen of another device. An example of these embodiments will be described below with respect to FIG. 7. The random phrases, digits or combination of phrases and digits are examples of patterns to be displayed on the screen of a user device.

The live verification process shown in FIG. 3 involves voice verification, liveliness verification and face verification. The voice verification, liveliness verification and face verification are performed at the same time. When live verification is initiated, the electronic device begins tracking the user's eye movement in step 304. Concurrently, the user speaks the displayed phrases/digits in step 306. This audio is captured by a verification agent running on the user device. The verification agent running on the user device also captures one or more images of the user's face in step 308. Verification is performed in steps 310, 312 and 314.

In step 310, the user's eye movement is compared to the location of the phrases/digits displayed on the screen. To perform voice verification, the user verbally dictates the displayed phrases or digits into the device's microphone. As the user verbally dictates the displayed phrases or digits, the device tracks the movement of the user's eyes. The verification agent can thus verify the liveliness of the user by comparing the movement of the user's eyes to the locations of the phrases or digits on the screen of the device.

Voice verification in step 312 is performed by the verification agent comparing the captured audio to the stored voice profile for the user. Face verification in step 314 involves comparing the one or more captured images of the user's face with the facial profile for the user using the verification agent. Face verification can be performed before, during or after the user verbally dictates the displayed phrases or digits displayed on the electronic device.

Using the live verification process, multiple verification credentials or verification input are gathered and analyzed at the same time. In step 316, a determination is made as to whether all of the live verification credentials match based on the comparisons in steps 310, 312 and 314. If one or more of the verification credentials is not successfully authenticated, then the user is denied access to the protected application in step 318. If all of the verification credentials are successfully authenticated, then the user is granted access to the protected application in step 320. Thus, the live verification process in FIG. 3 provides enhanced security relative to conventional techniques, as an imposter cannot use pre-recorded audio files or facial images to imitate a user's identity. Also, as multiple verification credentials are gathered and analyzed at the same time, the live verification process in FIG. 3 provides a quicker means of authentication.

Figure 4:
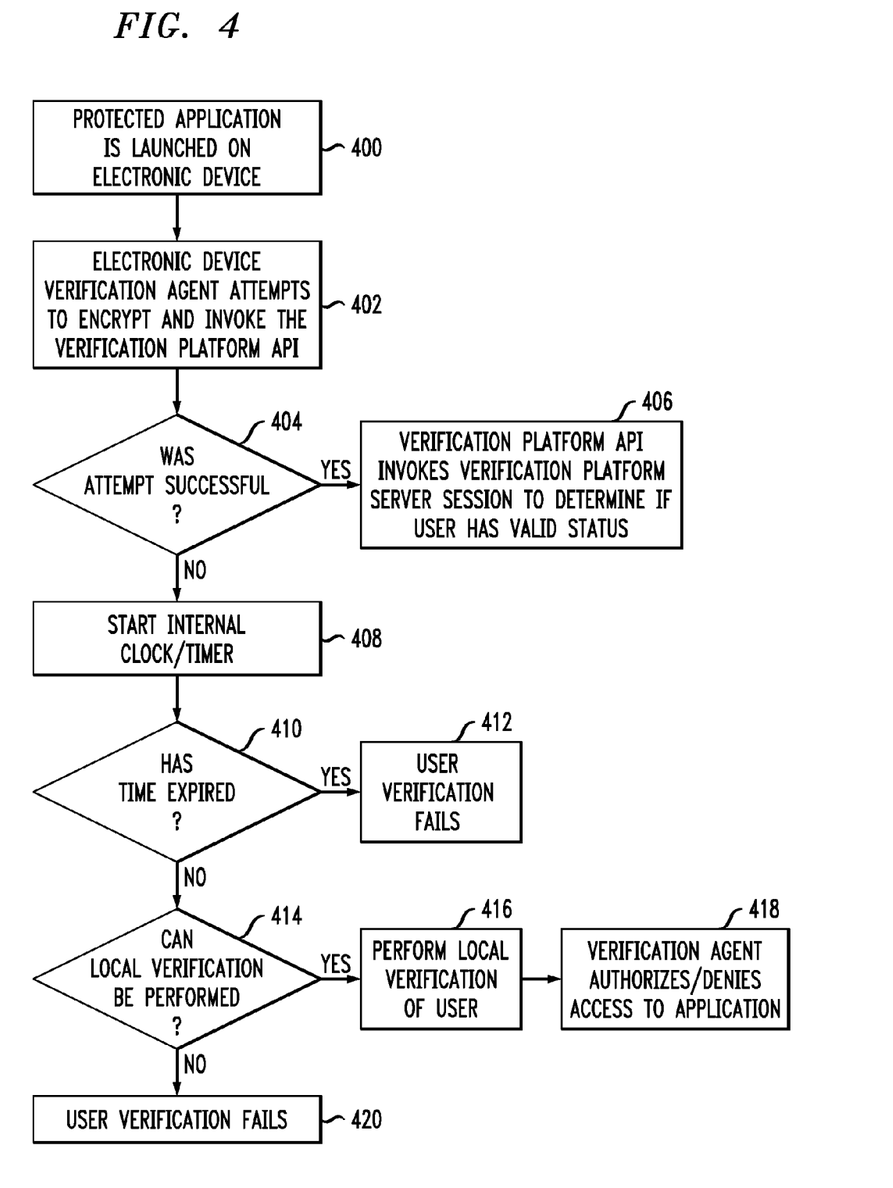
FIG. 4 is a flowchart illustrating a local verification process.

FIG. 4 illustrates a process for local verification. Once a user has enrolled a device for live verification, the live verification service provided by the verification platform can be utilized. A verification application is run in the background on the enrolled device. When a protected application is launched on the electronic device in step 400, the verification agent intercepts the launch process. The verification agent then attempts to encrypt and invoke the verification platform API in step 402. Next, a determination 404 is made as to whether the attempt to invoke the verification platform API as successful. If the attempt was successful, the verification platform API invokes a verification platform server session in step 406 to determine if the user has a valid status. The user then continues with a live verification process such as that described above with respect to FIG. 3.

If the verification agent cannot connect to the verification platform API, the process starts or activates an internal clock or timer in step 408. The clock or timer specifies a predetermined period of time in which the user must perform local verification. In step 410, a determination is made as to whether the predetermined time period has expired. If the predetermined time period has expired, user verification fails in step 412. The user must then wait until the verification agent can reconnect to the verification platform API to access the protected application. Local verification attempts made outside of the predetermined period of time will result in verification failure.

If the predetermined period of time has not expired, a user attempts to perform local verification. When local verification is attempted, the verification agent will first investigate the capabilities of the device to determine if local verification is capable of being performed in step 414. If the device is capable of collecting all necessary verification credentials, local verification can be attempted. The user then performs the live verification process required to access the protected application is performed in step 416. The live verification process in step 416 will occur on the user's device, with the verification agent comparing submitted verification credentials to a locally stored voice profile and facial profile. The verification agent will simultaneously verify the liveliness of the user. The verification agent authorizes or denies access to the protected application in step 418. If the submitted verification credentials are successfully matched to the locally stored user voice profile and facial profile, and the user liveliness is successfully verified, the user is granted access to the protected application. Otherwise, the user is denied access to the protected application.

If the user's device is not capable of performing live verification, user verification fails in step 420. For example, live verification involving voice and face verification requires a microphone and camera, respectively. In this example, if the user device does not have a camera or microphone, the user device will be unable to perform the live verification locally on that device.

Figure 5:
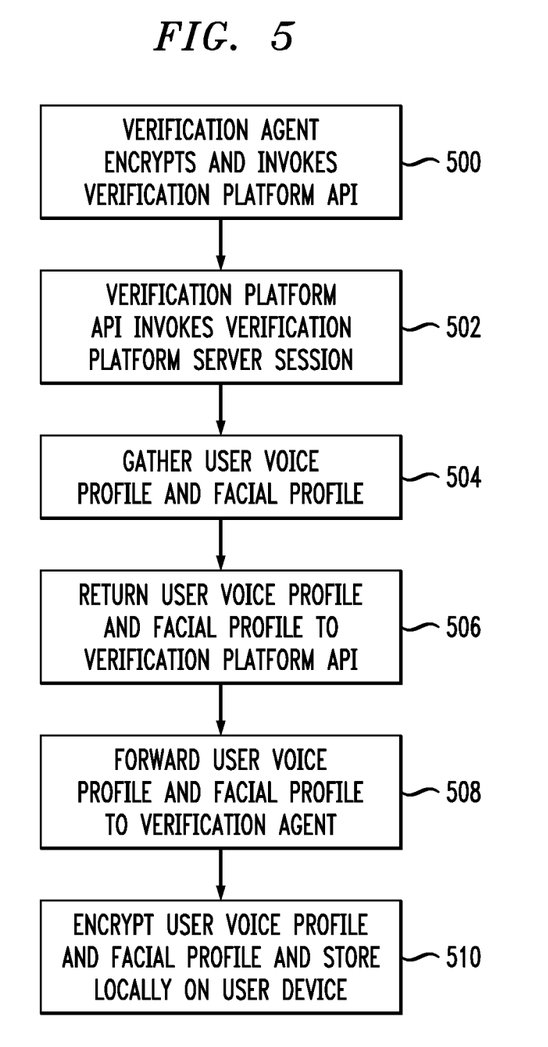
FIG. 5 is a flowchart illustrating synchronization of voice and facial profiles for a user.

FIG. 5 illustrates a process for synchronization of voice and facial profiles for a user in some embodiments of the invention. In other embodiments, local verification providers are not the same as remote verification providers. In such embodiments, synchronization need not be performed, as the verification credentials (e.g., biometric profiles such as voice and facial profiles) which are used for local verification may differ in format or specification from the verification credentials used for remote verification.

In some embodiments, the voice and facial profiles locally stored on a user's device are synchronized with the voice and facials profiles which are stored remotely on the verification platform server. When a connection is available, the verification agent running on the user's device encrypts and invokes the verification platform API in step 500 and requests a copy of the remotely stored user voice profile and facial profile. The verification agent can be programmed to attempt synchronization at predetermined intervals of time, or whenever a connection to the verification platform API is available.

Next, in step 502 the verification platform API invokes a verification platform server session. The verification platform server then gathers the user voice profile and facial profile in step 504. The retrieved user voice profile and facial profile is returned to the verification platform API in step 506. Next, the user voice profile and facial profile is forwarded from the verification platform API to the verification agent on the user's device in step 508. The user voice profile and facial profile are then encrypted and stored locally on the user's device in step 510. The locally stored voice profile and facial profile can then be accessed at a later time to perform local verification.

Figure 6:
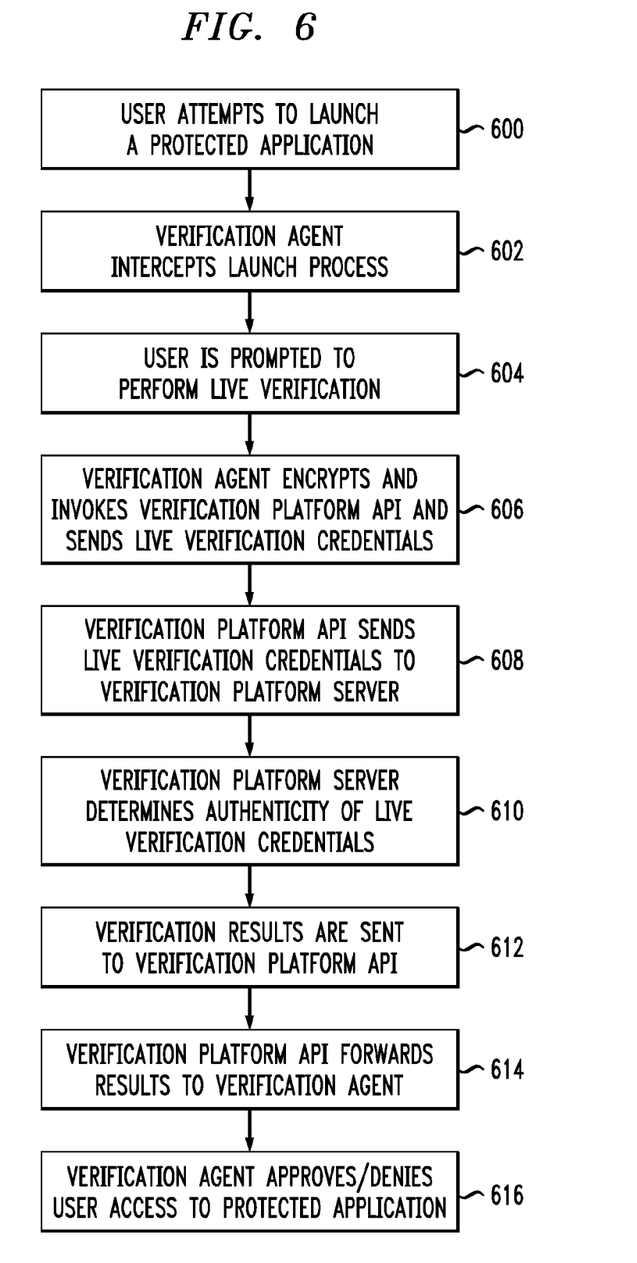
FIG. 6 is a flowchart illustrating a remote verification process.

FIG. 6 is a flowchart illustrating a remote verification process. If a connection between the verification agent on a user device and the verification platform API can be established, remote verification can be performed.

Remote verification begins with the user attempting to launch a protected application in step 600. In step 602, the verification agent intercepts the launch process. Next, the verification agent prompts the user to perform live verification in step 604. The verification agent may send a message to the user's device to prompt the user to perform live verification. The live verification process may be similar to that described above with respect to FIG. 3.

After completing the live verification process, the verification agent encrypts and invokes the verification platform API and sends the verification credentials to the verification platform API in step 606. In some embodiments, the verification credentials for voice and face verification are sent or submitted to the verification platform API to be authenticated while liveliness verification is performed and authenticated by the verification agent. In other embodiments, voice, face and liveliness verification credentials are all sent or submitted to the verification platform API to be authenticated.

The verification platform API in step 608 sends the live verification credentials to the verification platform server. This involves the verification platform API invoking a verification platform server session to determine the authenticity of the submitted verification credentials. In step 610, the verification platform server determines authenticity of the submitted verification credentials. The submitted verification credentials are compared to a voice profile and facial profile of the user to determine authenticity. In step 612, the verification results are sent from the verification platform server to the verification platform API, e.g., the verification platform server informs the verification platform API of the authenticity of the submitted verification credentials. In turn, the verification platform API in step 614 forwards the results to the verification agent on the user's device. Step 614 may involve sending a message or event notification to the verification agent. The verification agent in step 616 then either approves or denies user access to the protected application based on the verification results.

Figure 7:
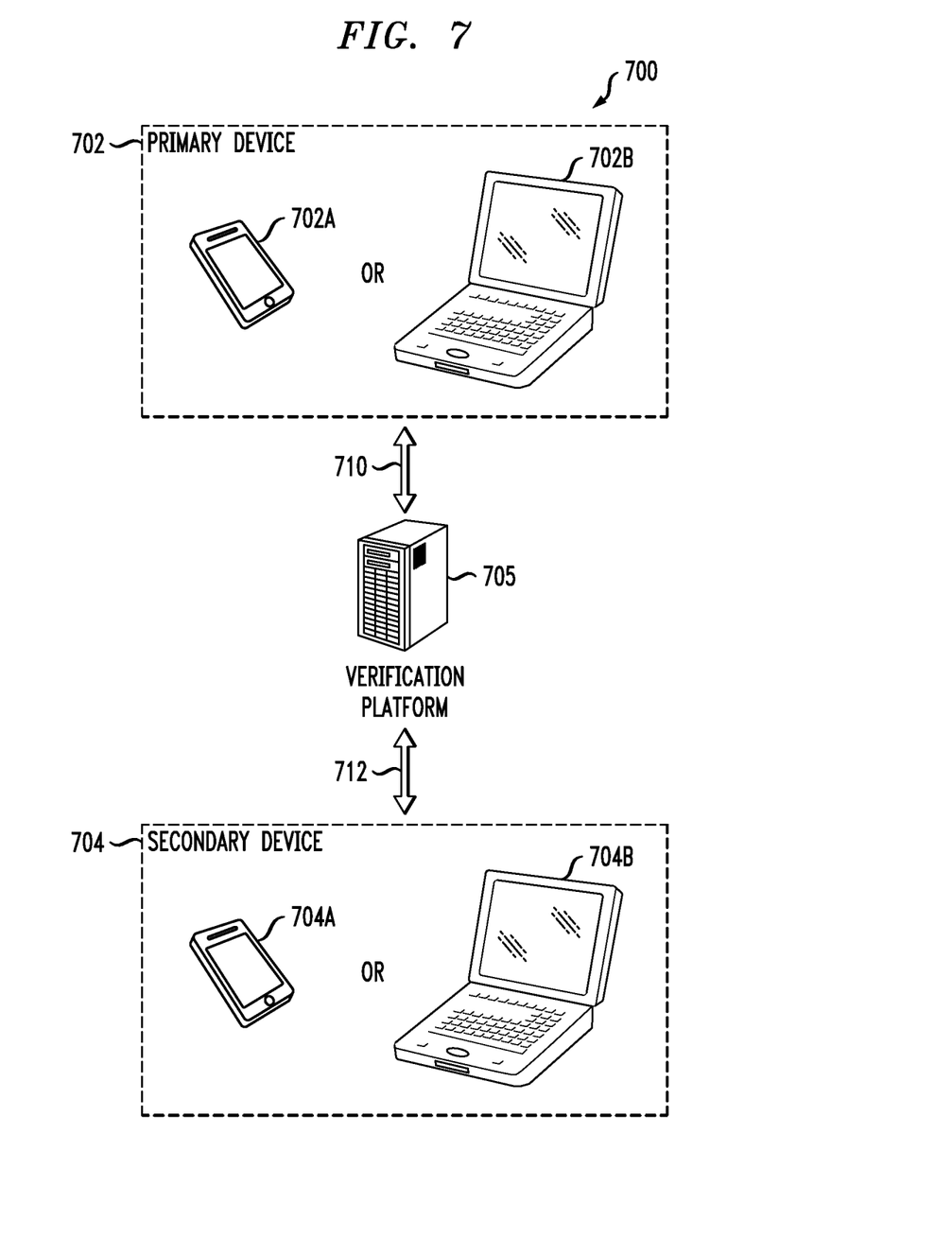
FIG. 7 shows an exemplary communication system comprising primary and secondary devices that communicate with a verification platform supporting the verification service.

An exemplary communication system in an illustrative embodiment of the invention is shown in FIG. 7. In this embodiment, a communication system 700 comprises a primary device 702, a secondary device 704 and a verification platform 705 arranged between the primary and secondary devices. The verification platform 705 communicates with the primary and secondary devices 702 and 704 via respective communication channels 710 and 712. There is no pairing or other direct communication required between the primary and secondary devices. The primary device 702 is illustratively shown as comprising one of a mobile telephone 702A or a laptop computer 702B. Similarly, the secondary device 704 is illustratively shown as comprising one of a mobile telephone 704A or a laptop computer 704B. A wide variety of other types of electronic devices may be used in other embodiments, including by way of example tablets, smart watches, desktops, and various other processing and computing devices.

In some embodiments, two user devices such as the primary device 702 and the secondary device 704 in the communication system 700 may be used for live verification. It is assumed in these embodiments that the verification service is supported by a verification platform that includes a verification platform API and a verification platform server. The verification platform API is adapted for communication with verification agents implemented on respective ones of the primary and secondary devices 702 and 704. The verification platform API is assumed to be coupled to the verification platform server so as to support communications between these platform components. The primary device 702 and secondary device 704 need not communicate directly. Instead, the primary device 702 and secondary device 704 may communicate by means of the verification platform 705.

In other embodiments, the primary and secondary devices pair with one another locally rather than through the verification platform. In such embodiments, the primary and secondary devices connect to one another using Bluetooth or a Near Field Communication (NFC) interface. For example, a user may have a smartphone which connects to a wearable verification device. The wearable verification device includes firmware and provides key management and cryptography, making the wearable verification device suitable for use as a secure element for user verification. The wearable verification device may take a number of physical form factors, such as an adhesive label, a credit card or smartcard, key fob, tag, smartwatch or other wearable device with an embedded processing device.

The primary device 702 and the secondary device 704 are both configured to run the verification application.

The verification platform 705 is configured to include a verification platform API and a verification platform server as noted above, but may comprise additional or alternative components in other embodiments.

In the FIG. 7 embodiment, a verification request is sent from the primary device 702 and processed by the verification platform 705, with the secondary device 704 being the source of the verification input required for live verification. Verification agents run on the respective primary and secondary devices 702 and 704, and information is sent from a given such verification agent to the verification platform API in encrypted form.

When a protected application is launched on the primary device 702, the verification agent on the primary device 702 intercepts the protected application launch process and encrypts and invokes the verification platform API via verification platform 705. The verification platform API provided by the verification platform 705 invokes a verification platform server session to determine the user's secondary device 704.

A request for live verification is sent through the verification platform API and forwarded to the verification agent on the secondary device 704. The user then submits the verification credentials required for live verification using the secondary device 704. The verification agent on the secondary device 704 then sends the user submitted verification credentials to the verification platform server using the verification platform API. The user submitted verification credentials are then compared with the user voice profile and facial profile. In addition, liveliness is determined by either the verification agent on the secondary device 704 or in the verification platform server.

Verification results are sent to the verification agent on the primary device 702 using the verification platform API. The verification agent on the primary device 702 then either approves or denies access to the protected application based on the verification results. Thus, if the live verification is successful, the protected application can be accessed by the user. Otherwise, the user cannot access the protected application.

Communications between the verification agents and the verification platform API may utilize one or more of JavaScript Object Notation syntax, REpresentational State Transfer (REST) based client-server architecture and mutual client-server certificate-based encryption and authentication.

As a more particular example of communications of the latter type, a verification application acting as a client provides a certificate to the verification platform server and the server provides its certificate to the client. Both certificates are verified using a certificate authority, which has signed both the client and server certificates. The information is transmitted between the client and server over a Secure Socket Layer (SSL), using 128 bit or 256 bit Advanced Encryption Standard (AES) cipher encryption. The cipher encryption strength may be selected at least in part as a function of parameters such as device operating system type and transport capabilities, as well as other factors influencing the ability of a given device to support the desired encryption level.

It should be understood that the above-noted communication types are only examples, and numerous other communications may be used in other embodiments. Additional details regarding the above-noted AES techniques as well as examples of other cryptographic techniques suitable for use in providing secure communications in embodiments of the invention can be found in A. J. Menezes et al., Handbook of Applied Cryptography, CRC Press, 1997, which is incorporated by reference herein.

It is to be appreciated that processing operations and other system functionality such as that described in conjunction with FIGS. 1 through 7 can be implemented at least in part in the form of one or more software programs stored in memory and executed by a processor of a processing device such as a computer or server. As will be described below, a memory or other storage device having such program code embodied therein is an example of what is more generally referred to herein as a "processor-readable storage medium."

Also, the particular processing operations and other system functionality described in conjunction with the flowcharts of FIGS. 1 through 6 are presented by way of illustrative example only, and should not be construed as limiting the scope of the invention in any way. Alternative embodiments can use other types of processing operations for live verification or other types of verification of user identity implemented using one or more user devices and a verification platform. For example, the ordering of the process steps may be varied in other embodiments, or certain steps may be performed concurrently with one another rather than serially.

The communication system 700 or portions thereof may be implemented using one or more processing platforms. For example, verification platform 705 may be implemented on a processing platform comprising a plurality of networked processing devices. An example of such a processing platform is processing platform 800 shown in FIG. 8.

Figure 8:
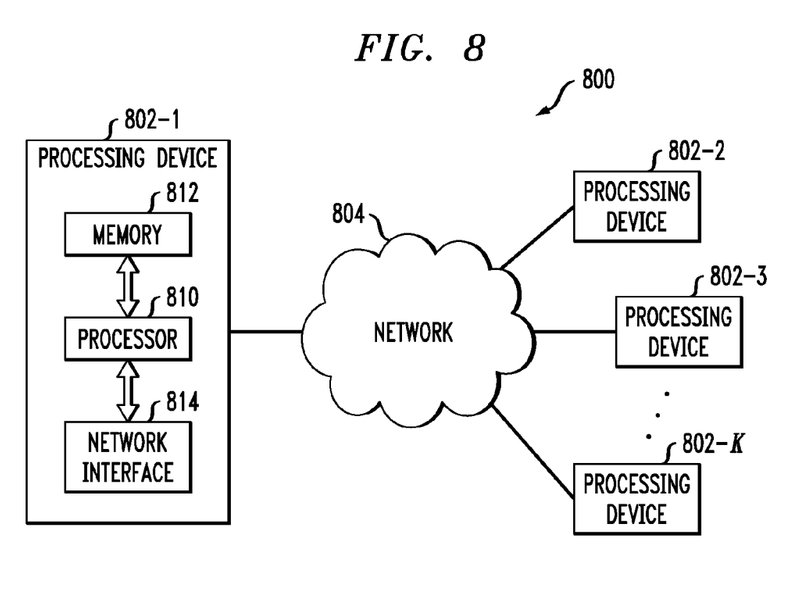
FIG. 8 shows an example of a processing platform comprising a set of networked processing devices that may be utilized to implement at least a portion of the communication system of FIG. 7.

The processing platform 800 in this embodiment comprises a portion of system 700 and includes a plurality of processing devices, denoted 802-1, 802-2, 802-3, . . . 802-K, which communicate with one another over a network 804.

The network 804 may comprise any type of network, including by way of example a global computer network such as the Internet, a wide area network (WAN), a local area network (LAN), a satellite network, a telephone or cable network, a cellular network, a wireless network such as Wi-Fi or WiMAX, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA) or other type of processing circuitry, as well as portions or combinations of such circuitry elements, and the memory 812, which may be viewed as an example of a processor-readable storage medium having executable computer program code embodied therein, may comprise random access memory (RAM), read-only memory (ROM) or other types of memory, in any combination.

Also included in the processing device 802-1 is network interface circuitry 814, which is used to interface the processing device with the network 804 and other system components, and may comprise one or more conventional transceivers.

The other processing devices 802 of the processing platform 800 are assumed to be configured in a manner similar to that shown for processing device 802-1 in the figure.

Again, the particular processing platform 800 shown in the figure is presented by way of example only, and communication system 700 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the communication system 700. Such components can communicate with other elements of the communication system 700 over any type of network or other communication media.

As indicated previously, components of a communication system as disclosed herein can be implemented at least in part in the form of one or more software programs stored in memory and executed by a processor of a processing device such as one of the processing devices 802. As noted above, a memory or other storage device having such program code embodied therein is an example of what is more generally referred to herein as a processor-readable storage medium. Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It should again be emphasized that the above-described embodiments of the invention are presented for purposes of illustration only. Many variations and other alternative embodiments may be used. For example, the particular types and arrangements of user devices, verification platforms and applications used in a given embodiment can be varied, as can the particular types of messaging or other communications exchanged between system components. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   receiving a verification request;
   responsive to receiving the verification request, sending one or more randomly generated patterns for display at one or more randomly specified locations on a screen of a device;
   responsive to the sending, receiving verification input responsive to the displayed one or more randomly generated patterns, the verification input comprising one or more captured images, captured audio and tracked eye movement, wherein the one or more captured images, the captured audio and the tracked eye movement are concurrently collected from a user of the device; and
   granting or denying the verification request based at least in part on the verification input;
   wherein granting the verification request comprises verifying liveliness of the user by:
   verifying, utilizing the captured audio, that a stored voice profile for the user matches user spoken phrases or digits corresponding to the one or more randomly generated patterns;
   verifying, utilizing the tracked eye movement, that one or more locations of the screen the user was viewing while speaking the phrases or digits corresponding to the one or more randomly generated patterns match the one or more randomly specified locations; and
   verifying, utilizing the one or more captured images, that a stored facial profile for the user matches a facial profile captured while the user was speaking the phrases or digits corresponding to the one or more randomly generated patterns.

2. The method of claim 1 wherein:
   receiving the verification request comprises receiving the verification request from a first device; and
   sending the one or more randomly generated patterns comprises sending the one or more randomly generated patterns to a second device different than the first device.

3. The method of claim 2 wherein receiving the verification request, sending the one or more randomly generated patterns, receiving the verification input, and granting or denying the verification request are implemented in a verification platform adapted for communication with the first device and the second device.

4. The method of claim 3 wherein granting of the verification request requires that both the first device and the second device are enrolled in a verification service supported by the verification platform.

5. The method of claim 1 wherein the phrases or digits comprise one or more combinations of phrases and digits.

6. The method of claim 1 wherein the verification request is generated in conjunction with an attempted launch of a designated application on a first device and wherein user access to the designated application on the first device is controlled responsive to the granting or denying of the verification request.

7. An article of manufacture comprising a non-transitory processor-readable storage medium having embodied therein one or more software programs, wherein the one or more software programs when executed by at least one processing device cause the method of claim 1 to be performed.

8. An apparatus comprising:
a verification platform comprising at least one processing device having a processor coupled to a memory;
wherein the verification platform is configured:
   to receive a verification request;
   responsive to receiving the verification request, to send one or more randomly generated patterns for display at one or more randomly specified locations on a screen of a device;
   responsive to sending the one or more randomly generated patterns, to receive verification input responsive to the displayed one or more randomly generated patterns, the verification input comprising one or more captured images, captured audio and tracked eye movement, wherein the one or more captured images, the captured audio and the tracked eye movement are concurrently collected from a user of the device; and
   to grant or deny the verification request based at least in part on the verification input;
wherein granting the verification request comprises verifying liveliness of the user by:
   verifying, utilizing the captured audio, that a stored voice profile for the user matches user spoken phrases or digits corresponding to the one or more randomly generated patterns;
   verifying, utilizing the tracked eye movement, that one or more locations of the screen the user was viewing while speaking the phrases or digits corresponding to the one or more randomly generated patterns match the one or more randomly specified locations; and
   verifying, utilizing the one or more captured images, that a stored facial profile for the user matches a facial profile captured while the user was speaking the phrases or digits corresponding to the one or more randomly generated patterns.

9. The apparatus of claim 8 wherein the verification platform is configured to receive the verification request from a first device and send the one or more randomly generated patterns to a second device different than the first device.

10. The apparatus of claim 9 wherein the verification platform comprises:
   an application programming interface adapted for communication with verification agents implemented on respective ones of the first and second devices; and
   a server coupled to the application programming interface.

11. A communication system comprising the apparatus of claim 9 and the first and second devices.

12. The apparatus of claim 9 wherein granting of the verification request requires that both the first device and the second device are enrolled in a verification service supported by the verification platform.

13. The apparatus of claim 8 wherein the verification request is generated in conjunction with an attempted launch of a designated application on a first device and wherein user access to the designated application on the first device is controlled responsive to the granting or denying of the verification request.

14. A method comprising:
   receiving, from a verification platform, a notification regarding a verification request, the notification comprising one or more randomly generated patterns for display at one or more randomly specified locations on a screen of a device; and
   responsive to receiving the notification, providing, to the verification platform, verification input responsive to the notification, the verification input comprising one or more captured images, captured audio and tracked eye movement, wherein the one or more captured images, the captured audio and the tracked eye movement are concurrently collected from a user of the device;
wherein the verification request is granted or denied by the verification platform based at least in part on the verification input; and
wherein granting the verification request comprises verifying liveliness of the user by:
   verifying, utilizing the captured audio, that a stored voice profile for the user matches user spoken phrases or digits corresponding to the one or more randomly generated patterns;
   verifying, utilizing the tracked eye movement, that one or more locations of the screen the user was viewing while speaking the phrases or digits corresponding to the one or more randomly generated patterns match the one or more randomly specified locations; and
   verifying, utilizing the one or more captured images, that a stored facial profile for the user matches a facial profile captured while the user was speaking the phrases or digits corresponding to the one or more randomly generated patterns.

15. The method of claim 14, wherein receiving the notification and providing the verification input are implemented in a device configured to operate as a second device relative to a first device, the first device being the source of the verification request.

16. The method of claim 15 wherein granting of the verification request requires that both the first device and the second device are enrolled in a verification service supported by the verification platform.

17. The method of claim 14, further comprising generating the verification request in conjunction with an attempted launch of a designated application on a first device;
   wherein user access to the designated application on the first device is controlled responsive to the granting or denying of the verification request; and
   wherein receiving the notification from the verification platform and providing the verification input to the verification platform is responsive to invoking an application programming interface of the verification platform using a verification agent on the first device.

18. The method of claim 17 further comprising:
   in the event that the verification agent is unable to invoke the application programming interface of the verification platform, starting an internal timer at the first device;
   performing local verification at the first device within a given time period specified by the internal timer; and
   granting access to the designated application responsive to successful local verification within the given time period, otherwise denying access to the designated application.

19. The method of claim 18 further comprising attempting to invoke the application programming interface of the verification platform after expiration of the internal timer in the event that:
   local verification within the given time period is unsuccessful; or
   the first device does is not capable of performing local verification.

20. An article of manufacture comprising a non-transitory processor-readable storage medium having embodied therein one or more software programs, wherein the one or more software programs when executed by at least one processing device cause the method of claim 14 to be performed.

* * * * *